US007827458B1

(12) United States Patent
Salsbury et al.

(10) Patent No.: US 7,827,458 B1
(45) Date of Patent: Nov. 2, 2010

(54) PACKET LOSS ERROR RECOVERY (75) Inventors: Ryan R. Salsbury, San Francisco, CA (US); James Oliver Normile, Los Altos, CA (US); Hyeonkuk Jeong, San Jose, CA (US); Joe S. Abuan, Milpitas, CA (US); Barin G. Haskell, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 10/379,012

(22) Filed: Mar. 3, 2003

(51) Int. Cl.
*H04L 1/18* (2006.01)

(52) U.S. Cl. ............ 714/748; 375/240.12; 375/240.27; 382/238

(58) Field of Classification Search ................ 714/748; 375/240.12, 240.27; 382/238
See application file for complete search history.

(56) References Cited

U.S. PATENT DOCUMENTS

| | | | | |
|---|---|---|---|---|
| 4,369,464 | A * | 1/1983 | Temime | 375/240.12 |
| 5,222,080 | A * | 6/1993 | Wang et al. | 370/422 |
| 6,104,757 | A * | 8/2000 | Rhee | 375/240.12 |
| 6,115,071 | A | 9/2000 | Hurst, Jr. et al. | |
| 6,148,005 | A | 11/2000 | Paul et al. | |
| 6,151,636 | A | 11/2000 | Schuster et al. | |
| 6,357,028 | B1 * | 3/2002 | Zhu | 714/751 |
| 6,373,842 | B1 * | 4/2002 | Coverdale et al. | 370/394 |
| 6,473,558 | B1 | 10/2002 | Wu et al. | |
| 6,480,539 | B1 | 11/2002 | Ramaswamy | |
| 6,490,705 | B1 | 12/2002 | Boyce | |
| 6,611,561 | B1 * | 8/2003 | Hannuksela et al. | 375/240.27 |
| 6,744,924 | B1 * | 6/2004 | Hannuksela et al. | 382/232 |
| 6,983,016 | B2 * | 1/2006 | Hourunranta | 375/240.12 |
| 7,164,680 | B2 * | 1/2007 | Loguinov | 370/394 |
| 2002/0021752 | A1 | 2/2002 | Hannuksela | |
| 2002/0109787 | A1 | 8/2002 | Moni et al. | |

(Continued)

OTHER PUBLICATIONS

Johnson, Joel. TechTarget Knowledgebase. Aug. 3, 2002. http://expertanswercenter.techtarget.com/eac/knowledgebaseAnswer/0,295199,sid63_gci975228,00.html.*

(Continued)

*Primary Examiner*—Kevin L Ellis
*Assistant Examiner*—Steve Nguyen
(74) *Attorney, Agent, or Firm*—Schwegman, Lundberg & Woessner, P.A.

(57) ABSTRACT

A method, apparatus, system, and signal-bearing medium that in an embodiment detect that a first packet is not received, add a place holder for the first packet in a buffer, request retransmission of the first packet, and create an estimated packet based on a combination of a second packet previous to the first packet, a third packet following the first packet, and a fourth packet from a previous frame that is spatially corresponding to the first packet. In another embodiment, a method, apparatus, system, and signal-bearing medium are provided that send a encoded packet to a receiver, save the encoded packet in a bitstream, determine whether the encoded packet is lost, and when the encoded packet is lost, decode the bitstream with the lost packet omitted and insert a reconstructed frame associated with the lost packet into a reference frame storage. In another embodiment, when the encoded packet is lost, a decoder is run on a reference frame chosen as the last uncorrupted frame. In another embodiment, when the encoded packet is lost, the decoder is run on a frame chosen from a set of previously stored reference frames.

8 Claims, 4 Drawing Sheets

U.S. PATENT DOCUMENTS

2003/0039312 A1    2/2003    Horowitz et al.

OTHER PUBLICATIONS

Yao Wang; Qin-Fan Zhu. "Error control and concealment for video communication: a review". Proceedings of the IEEE. vol. 86, Issue 5, May 1998 pp. 974-997.*

"Introduction to MPEG-2", http://www.dtg.org.uk/reference/tutorial/mpeg.htm, (Dec. 19, 2002).

Wang, Y., et al., "Error Control and Concealment for Video Communication: A Review", *Proceedings of the IEEE*, 86(5), (May 1998), pp. 974-997.

Raman, A., et al., "A Low Complexity Error Concealmetn Scheme for MPEG-4 Coded Video Sequences", *Proceedings, Tenth Annual Symposium on Multimedia Communications and Signal Proceessing*, (Nov. 22-24, 2001, Bangalore, India),(2001),5 pgs.

Salama, P., et al., "Error Concealment Techniques for Encode Video Stream", 4 pgs., Oct. 1995.

\* cited by examiner

PACKET LOSS ERROR RECOVERY

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to error recovery after loss of packet data in a network.

BACKGROUND

In the past, people met face-to-face when they wanted to communicate. But, in today's mobile, widely dispersed, and increasingly interconnected society, people often need to communicate with others who are far away. In order to facilitate this communication, video conferencing is gaining in popularity.

In video conferencing, both parties have a conferencing system that may include a microphone, a camera, a speaker, and a video monitor, and the parties are connected to each other via a network. In this way, the parties can converse while viewing moving video images of each other. Video images contain a large amount of data, which requires a large amount of storage and data transfer bandwidth, so the sending conferencing system often compresses the video and the receiving system decompresses the video prior to display.

Video compression algorithms use interframe compression to remove temporal redundancies between frames. Interframe compression involves storing only the differences between successive frames in the data stream. Interframe compression stores the entire image of a key frame or reference frame, generally in a moderately compressed format. Then, successive frames are compared with the key frame, and only the differences between the key frame and the successive frames are stored and transmitted. Periodically, such as when new scenes are displayed, new key frames are stored, and subsequent comparisons begin from this new reference point. Examples of video compression that use an interframe compression technique are MPEG (Moving Picture Experts Group), H261, H263, H264 (also known as JVT (Joint Video Team), AVC (Advanced Video Coding), MPEG 4 part 10), DVI (Digital Video Interactive) PLV (Production Level Video), and Indeo, among others. The H264 standard is well suited to an embodiment of the invention since it defines multiple references frames. The video decoding process is generally the inverse of the video encoding process and is employed to reconstruct a moving image sequence from a compressed and encoded bitstream. The receiver decodes data in the bitstream according to a syntax that is defined by the data compression algorithm.

Interframe compression works well as long as the receiver receives all of the data packets. Unfortunately, some networks, such as the Internet, suffer from a high rate of packet loss and resulting transmission delays. In particular, depending on conditions such as how congested the Internet is at any given time, loss of entire packets has been found to occur on the Internet at a rate of up to 25%, or up to one in every four packets.

When the receiver detects a packet loss, the receiver either requests transmission of a keyframe or a portion of a keyframe or requests retransmission of the lost packet(s). Thus, the reconstruction and display of the video must wait until the retransmitted packet(s) have been received. Real-time video signals (especially compressed signals) are highly sensitive to delay and will appear jumpy, interrupted, or otherwise distorted if the packets do not flow continuously to the receiving end. Therefore, although the loss of packets in a real time video transmission has been correctable, the resulting video images have often been of unacceptable quality, leading to user dissatisfaction.

Although the problems of packet loss have been described in the context of video conferencing, they can also occur with transmission of video data over the Internet or with transmission of any compressed data.

SUMMARY

A method, apparatus, system, and signal-bearing medium are provided that in an embodiment detect that a first packet is not received, add a place holder for the first packet in a buffer, request retransmission of the first packet, and create an estimated packet based on a combination of a second packet previous to the first packet, a third packet following the first packet, and a fourth packet from a previous frame that is spatially corresponding to the first packet. In another embodiment, a method, apparatus, system, and signal-bearing medium are provided that send a encoded packet to a receiver, save the encoded packet in a bitstream, determine whether the encoded packet is lost, and when the encoded packet is lost, decode the bitstream with the lost packet omitted and insert a reconstructed frame associated with the lost packet into a reference frame storage. In another embodiment, when the encoded packet is lost, a decoder is run on a reference frame chosen as the last uncorrupted frame. In another embodiment, when the encoded packet is lost, the decoder is run on a frame chosen from a set of previously stored reference frames.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The following detailed description is, therefore, not to be taken in a limiting sense, and the scope of the present invention is defined only by the appended claims.

In the following description, numerous specific details are set forth to provide a thorough understanding of the invention. It is understood, however, that the invention may be practiced without these specific details. In other instances, well-known circuits, structures, and techniques have not been shown in detail in order not to obscure the invention.

Figure 1:
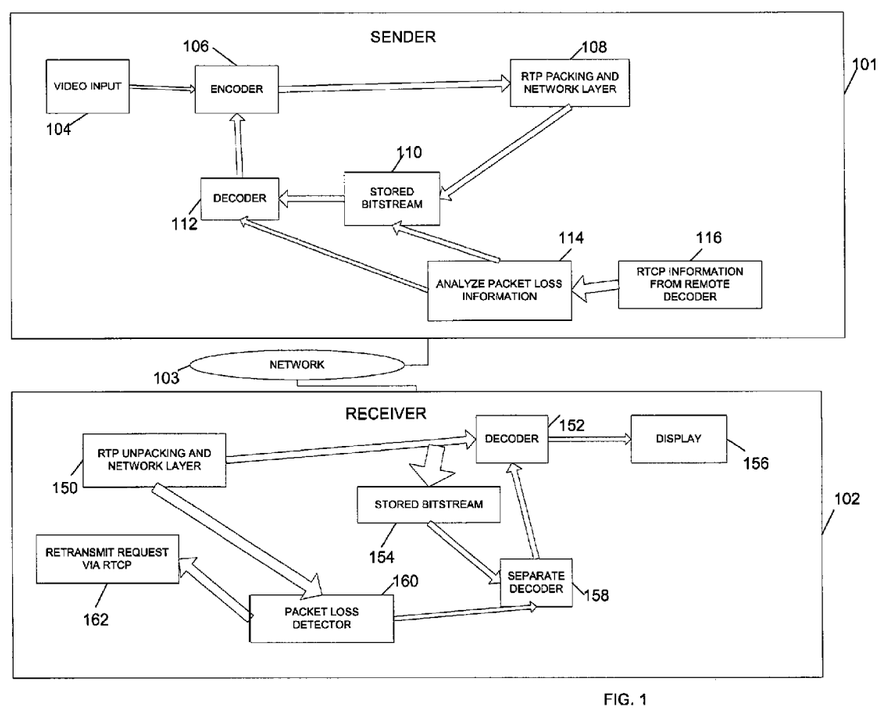
FIG. 1 depicts a block diagram of an example system for implementing an embodiment of the invention.

FIG. 1 depicts a block diagram of an example system for implementing an embodiment of the invention. A sender 101 is connected to a receiver 102 via a network 103.

At the sender 101, an encoder 106 receives video input 104, encodes it and sends the encoded video to an RTP (Real Time Protocol) packing and network layer 108, which packs the encoded video into the stored bitstream 110. Although RTP is illustrated in FIG. 1, in other embodiments any appropriate protocol may be used. In various embodiments, the video input 104 may originate from a camera, a storage device, or the network 103.

The stored bitstream 110 is sent to the receiver 102 and is also run through a decoder 112, which sends its output to the encoder 106, as further described below with reference to FIG. 3. RTCP (Real Time Control Protocol) information 116 is received from a remote decoder 152 at the receiver 102 and is analyzed for packet loss information 114. Although RTCP is illustrated in FIG. 1, in other embodiments any appropriate protocol may be used. The results of the analysis are sent to the stored bitstream 110 and to a decoder 112, which performs a decoding process and provides the results to the encoder 106. The processing of the sender 101 is further described below with reference to FIG. 3.

At the receiver 102, the RTP unpacking and network layer 150 receives packets of data from the network 103, unpacks them, and sends them to both the decoder 152 and the packet loss detector 160. The decoder 152 decodes the data in the packet into a frame and stores the frame in a bitstream 154. The decoder 152 sends the frame to a display device 156. The packet loss detector 160 detects that a packet has not been received and sends a retransmit request via RTCP 162. The packet loss detector 160 also sends information about the lost packet to the separate decoder 158, which performs a separate decoding process on the stored bitstream 154 and sends the results to the decoder 152. The processing of the receiver 102 is further described below with reference to FIG. 2.

The network 103 may be any suitable network and may support any appropriate protocol suitable for communication between the sender 101 and the receiver 102. In an embodiment, the network 103 may support wireless communications. In another embodiment, the network 103 may support hard-wired communications, such as a telephone line or cable. In another embodiment, the network 103 may support the Ethernet IEEE (Institute of Electrical and Electronics Engineers) 802.3x specification. In another embodiment, the network 103 may be the Internet and may support IP (Internet Protocol). In another embodiment, the network 103 may be a local area network (LAN) or a wide area network (WAN). In another embodiment, the network 103 may be a hotspot service provider network. In another embodiment, the network 103 may be an intranet. In another embodiment, the network 103 may be a GPRS (General Packet Radio Service) network. In another embodiment, the network 103 may be any appropriate cellular data network or cell-based radio network technology. In another embodiment, the network 103 may be an IEEE 802.11B wireless network. In still another embodiment, the network 103 may be any suitable network or combination of networks. Although one network 103 is shown, in other embodiments any number of networks (of the same or different types) may be present.

Figure 2:
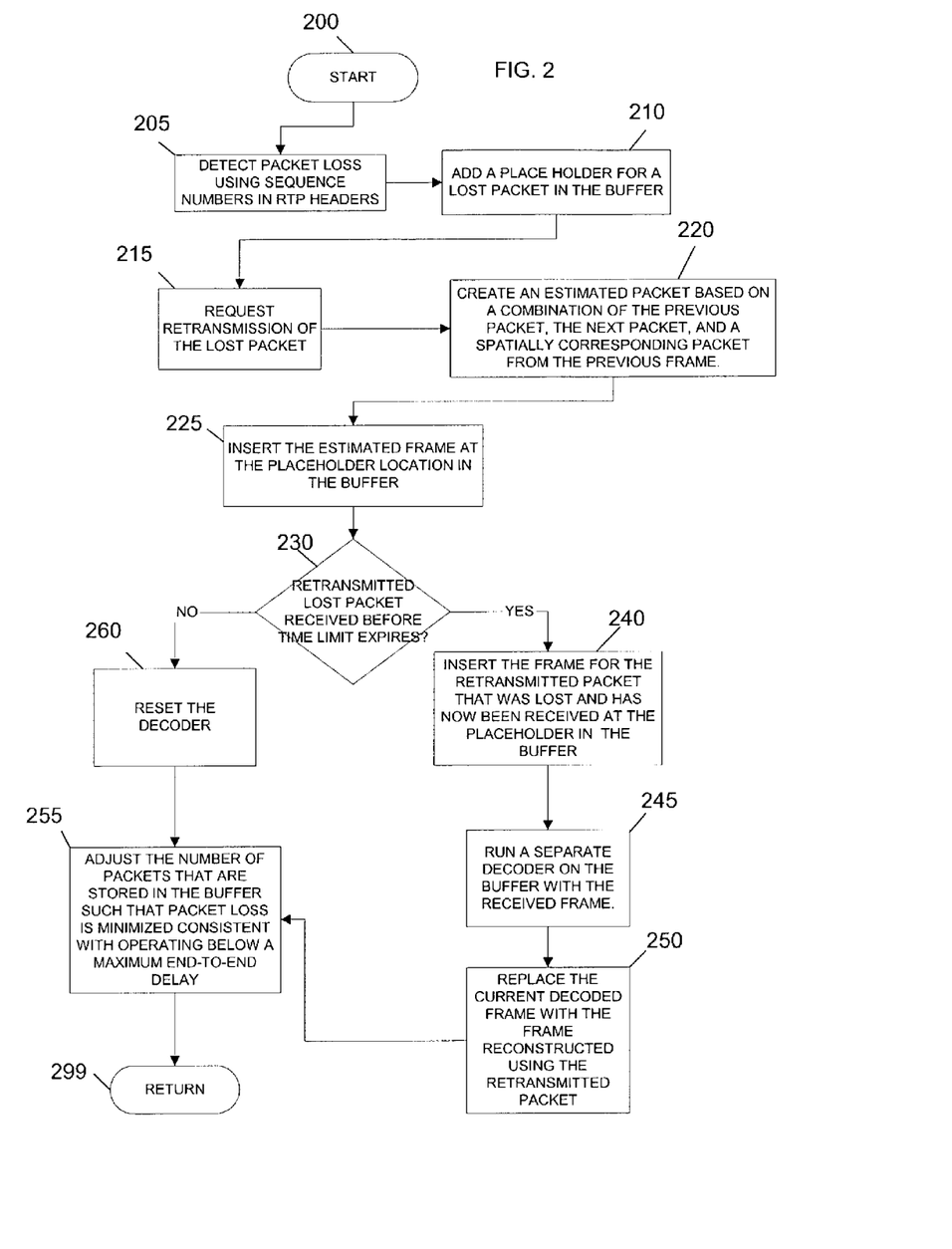
FIG. 2 depicts a flowchart of example processing at a receiver, according to an embodiment of the invention.

FIG. 2 depicts a flowchart of example processing at the receiver 102 (FIG. 1), according to an embodiment of the invention. Control begins at block 200. Control then continues to block 205 where the packet loss detector 160 receives unpacked data from the RTP unpacking and network layer 150 and detects that a packet loss has occurred using sequence numbers in the RTP headers. In another embodiment, any appropriate protocol may be used and any means for detecting that packet has not been received may be used. Control then continues to block 210 where the packet loss detector 160 adds a place holder for the lost packet in the bitstream in a buffer. Control then continues to block 215 where a request is sent to the sender 101 requesting that the lost packet be retransmitted. Control then continues to block 220 where an estimated packet is created based on a combination of the packet previous to the lost packet, the next packet following the lost packet, and a packet spatially corresponding to the lost packet from the previous frame. Control then continues to block 225 where an estimated frame is created from the estimated packet, and the estimated frame is inserted at the placeholder location in the bitstream in the buffer. Control then continues to block 230 where a determination is made whether the lost packet that was previously requested to be retransmitted at block 215 has been received before a time limit expires.

If the determination at block 230 is true, then control continues to block 240 where the frame for the retransmitted packet that was lost and has now been received is inserted into the buffer. Control then continues to block 245 where the separate decoder 158 is run on the bitstream in the buffer including the frame for the retransmitted packet. Control then continues to block 250 where the current decoded frame is replaced with the frame reconstructed using the retransmitted packet. Control then continues to block 255 where the number of packets that are stored in the buffer is adjusted so that packet loss is minimized consistent with operating below a maximum end-to-end delay. Control then continues to block 299 where the function returns.

If the determination at block 230 is false, then control continues from block 230 to block 260 where the decoder 152 is reset. Control then continues to block 255, as previously described above.

Figure 3:
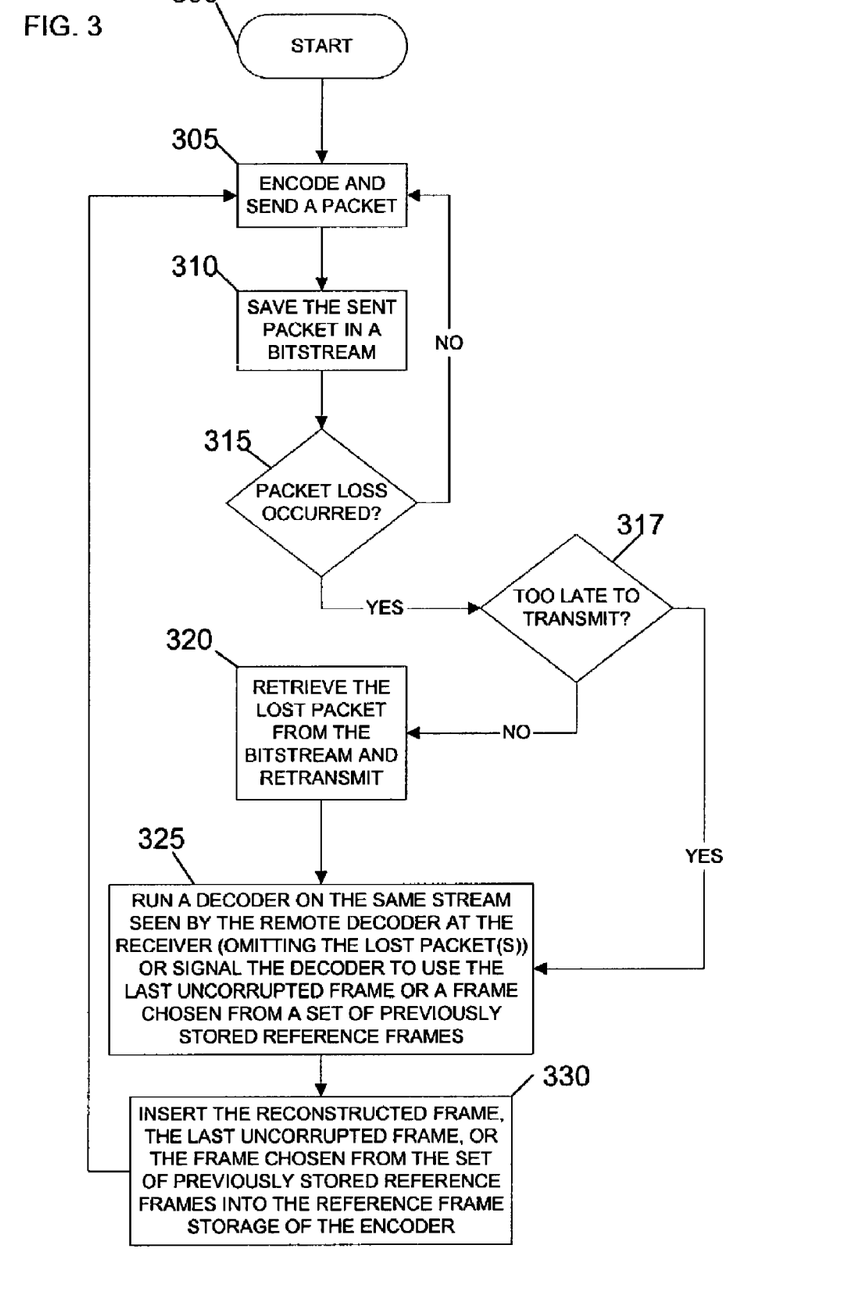
FIG. 3 depicts a flowchart of example processing at a sender, according to an embodiment of the invention.

FIG. 3 depicts a flowchart of example processing at the sender 101 (FIG. 1), according to an embodiment of the invention. Control begins at block 300. Control then continues to block 305 where the encoder 106 encodes a packet of video data and sends the packet to the receiver 102 via the network 103. Control then continues to block 310 where the sent packet is saved in the stored bitstream 110. Control then continues to block 315 where a determination is made whether a packet loss has occurred. The determination can be made by analyzing information sent to the sender 101 by the receiver 102. If the determination at block 315 is false, then control returns to block 305, as previously described above.

If the determination at block 315 is true, then control continues from block 315 to block 317 where a determination is made whether it is too late to retransmit the lost packet. If the determination at block 317 is false, then control continues to block 320 where the packet which was lost is retrieved from the stored bitstream 110 and retransmitted to the receiver 102.

Control then continues to block 325 where the decoder 112 is run on the same bitstream that is seen by the decoder 152 at the receiver. That is, the decoder 112 is run on a bitstream with the lost packet removed to reconstruct the same estimated frame that the receiver 102 creates at block 220, as previously described above. In another embodiment, the decoder 112 is nm on a reference frame chosen as the last uncorrupted frame, the decoded frame is input to the encoder 106 as its next frame to encode, and this choice is signaled to the decoder 152 at the receiver 102. In another embodiment, the decoder 112 is run on a frame chosen from a set of previously stored reference frames, the decoded frame is input to the encoder 106 as its next frame to encode, and this choice is signaled to the decoder 152 at the receiver 102. In an embodiment, the encoder 106 evaluates the cost (in bits) of each of the alternatives and chooses the solution that the decoder 112 runs that minimizes the bits in the bitstream, subject to a quality constraint. Control then continues to block 330 where the estimated frame is placed into the stored bitstream 110 of the sender 101. After the completion of block 330, the sender 101 and the receiver 102 are once again running their respective encoder and decoder on the same bitstream. Control then returns to block 305 where the estimated frame will be used in the subsequent encoding of packets.

Control then continues to block 330 where the estimated frame is placed into the stored bitstream 110 of the sender 101. After the completion of block 330, the sender 101 and the receiver 102 are once again running their respective encoder and decoder on the same bitstream. Control then returns to block 305 where the estimated frame will be used in the subsequent encoding of packets.

If the determination at block 317 is true, then control continues from block 317 to block 325, as previously described above.

Figure 4:
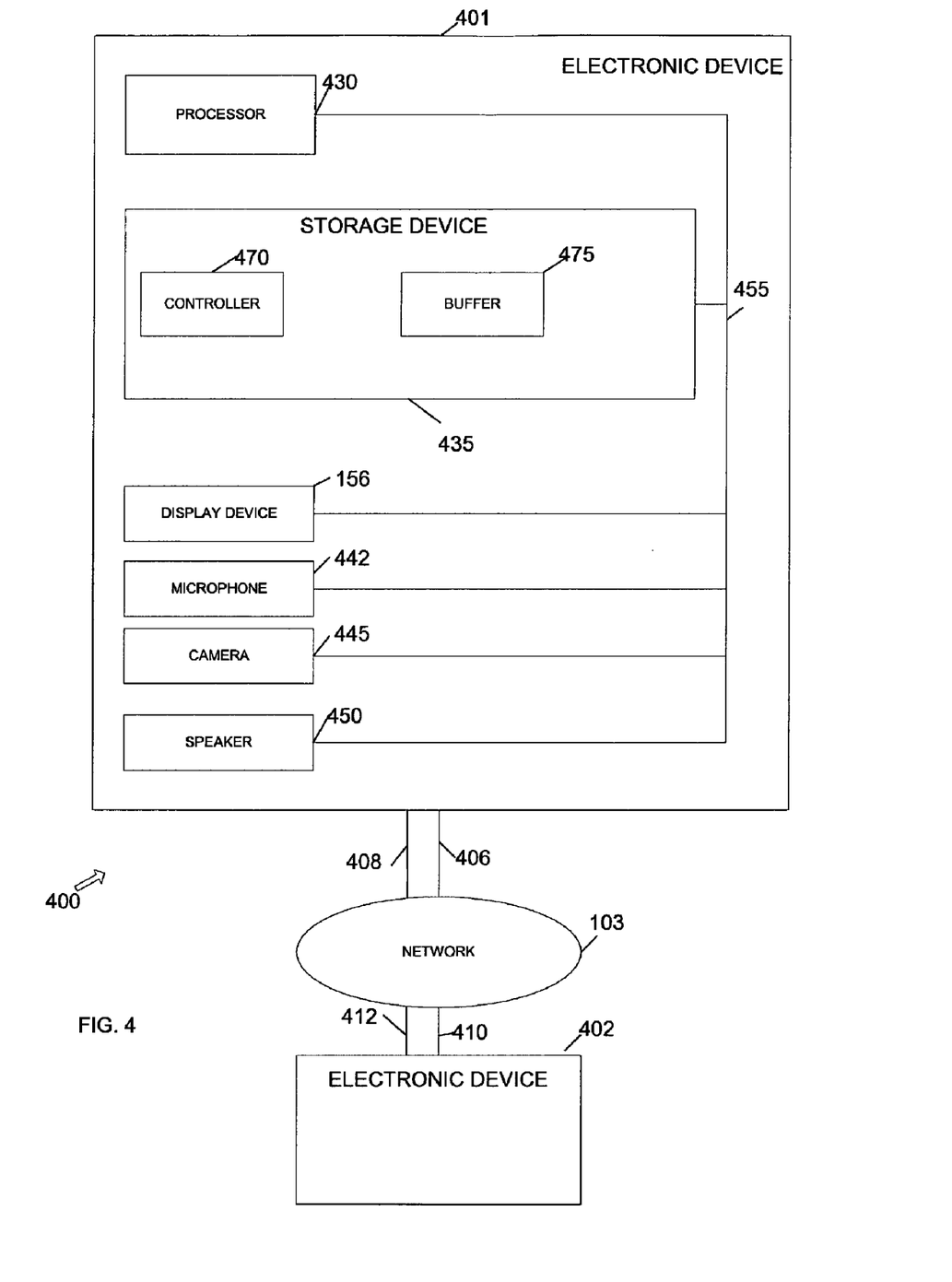
FIG. 4 depicts a block diagram for an example system for implementing an embodiment of the invention.

FIG. 4 depicts a block diagram of an example system 400 for implementing an embodiment of the invention. The system 400 includes an electronic device 401 connected to an electronic device 402 via the network 103. Although one electronic device 401, one electronic device 402, and one network 103 are shown, in other embodiments any number or combination of them are present.

The electronic device 401 includes a processor 430, a storage device 435, a display device 156, a microphone 442, camera 445, and a speaker 450, all connected directly or indirectly via a bus 455.

The processor 430 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 430 executes instructions and includes that portion of the electronic device 401 that controls the operation of the entire electronic device. Although not depicted in FIG. 1, the processor 430 typically includes a control unit that organizes data and program storage in memory and transfers data and other information between the various parts of the electronic device 401. The processor 430 receives input data from the network 103, the microphone 442, and/or the camera 445, reads and stores code and data in the storage device 435, and presents data to the network 103, the display device 156, and/or the speaker 450.

Although the electronic device 401 is shown to contain only a single processor 430 and a single bus 455, the present invention applies equally to electronic devices that may have multiple processors and to electronic devices that may have multiple buses with some or all performing different functions in different ways.

The storage device 435 represents one or more mechanisms for storing data. For example, the storage device 435 may include read only memory (ROM), random access memory (RAM), magnetic disk storage media, optical storage media, flash memory devices, and/or other machine-readable media. In other embodiments, any appropriate type of storage device may be used. Although only one storage device 435 is shown, in other embodiments multiple storage devices and multiple types of storage devices may be present. Further, although the electronic device 401 is drawn to contain the storage device 435, it may be distributed across other electronic devices.

The storage device 435 includes a controller 470 and a buffer 475, which stores the bitstream 110 or 154. The controller 470 includes instructions capable of being executed on the processor 430 to carry out the functions of the present invention, as previously described above with reference to FIGS. 1, 2, and/or 3. In another embodiment, some or all of the functions of the present invention are carried out via hardware in lieu of a processor-based system. Of course, the storage device 435 may also contain additional software and data (not shown), which is not necessary to understanding the invention.

In an embodiment, the electronic device 401 represents the sender 101 and the controller 470 implements the encoder 106, the RTP packing and network layer 108, the decoder 112, and the analysis of the packet loss information 114. In another embodiment, the electronic device 401 represents the receiver 102, and the controller 470 implements the RTP unpacking and network layer 150, the decoder 152, the separate decoder 158, and the detector of the packet loss 160. In another embodiment, the electronic device 401 can both transmit and receive video and thus includes elements capable of performing the functions of both the sender 101 and the receiver 102.

Although the controller 470 is shown to be within the storage device 435 in the electronic device 401, in another embodiment the controller 470 may be distributed across other systems.

The display device 156 displays video and/or still images to the user. The display device 156 may be a cathode-ray tube (CRT) based video display well known in the art of computer hardware. But, in other embodiments the display device 156 may be replaced with a liquid crystal display (LCD) based or gas, plasma-based, flat-panel display. In still other embodiments, any appropriate display device may be used. Although only one display device 156 is shown, in other embodiments, any number of display devices of different types or of the same type may be present.

The microphone 442 collects sound and transmits the sound to the controller 470 as data. Although only one microphone 442 is shown, in another embodiment any number and type of microphones may be present.

The camera 445 collects still or moving video data and presents the video data to the controller 470. In an embodiment, the camera 445 is the source of the video input 104 (FIG. 1). Although only one camera 445 is shown, in other embodiments any number and type of cameras may be present.

The speaker 450 presents audio output. Although only one speaker 450 is shown, in other embodiments any number and type of speakers may be present.

The bus 455 may represent one or more busses, e.g., PCI, ISA (Industry Standard Architecture), X-Bus, EISA (Extended Industry Standard Architecture), or any other appropriate bus and/or bridge (also called a bus controller).

The electronic device 401 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the electronic device 401. The hardware and software depicted in FIG. 4 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted. Further, the electronic device 401 may include any number and type of input devices for receiving input from a user, e.g., a keyboard, mouse or other pointing device, or a voice-recognition device.

The electronic device 401 may use both a signaling channel 406 and a media (audio and/or video) channel 408 to the network 103. Similarly, the electronic device 402 may have both a signaling channel 410 and a media channel 412 to the network 103. Although the signaling channels and the media channels are drawn to be separate, in another embodiment they may be combined.

The electronic device 402 may include components analogous to some or all of the components already described for the electronic device 401.

As was described in detail above, aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

What is claimed is:

1. A method of recovering from packet loss in transmission of video data, comprising:
   receiving video data at a receiver device from a sender device;
   detecting at the receiver device that a first packet is not received using sequence numbers in real time protocol headers, the packet containing data from a first video frame;
   adding a place holder for the first packet in a buffer at the receiver device;
   sending a request from the receiver device to the sender device for retransmission of the first packet; and
   creating an estimated packet at the receiver device based on a combination of a second packet of video data previous to the first packet, a third packet of video data following the first packet, and a fourth packet of video data from a previous video frame that is spatially corresponding to the data of the first packet;
   creating an estimated frame at the receiver device based on the estimated packet;
   adding the estimated frame at the placeholder in the buffer;
   running a first decoder on the buffer with the estimated frame;
   wherein, when the retransmission of the first packet is received before a time limit expires, replacing the decoded estimated frame with a reconstructed frame associated with the retransmitted first packet into the buffer at the placeholder, and running a second decoder on the buffer with the frame associated with the retransmitted first packet.

2. The method of claim 1, further comprising:
   adjusting a number of packets stored in the buffer to minimize packet loss consistent with operating below a maximum end-to-end delay.

3. An apparatus for recovering from packet loss in transmission of video data at a receiver device, the apparatus comprising:
   means for receiving video data at a receiver device from a sender device;
   means for detecting that a first packet is not received using sequence numbers in real time protocol headers, the packet containing data from a first video frame;
   means for adding a place holder for the first packet in a buffer;
   means for sending a request from the receiver device to the sender device for the retransmission of the first packet; and
   means for creating an estimated packet at the receiver device based on a combination of a second packet of video data previous to the first packet, a third packet of video data following the first packet, and a fourth packet of video data from a previous video frame that is spatially corresponding to the first packet;
   means for creating an estimated frame at the receiver device based on the estimated packet;
   means for adding the estimated frame at the placeholder in the buffer;
   means for running a first decoder on the buffer with the estimated frame;
   wherein, when the retransmission of the first packet is received before a time limit expires, replacing the decoded estimated frame with a reconstructed frame associated with the retransmitted first packet into the buffer at the placeholder, and running a second decoder on the buffer with the frame associated with the retransmitted first packet.

4. The apparatus of claim 3, further comprising:
   means for adjusting a number of packets stored in the buffer to minimize packet loss consistent with operating below a maximum end-to-end delay.

5. A machine-readable storage medium bearing instructions for recovering from packet loss in transmission of video data, wherein the instructions when read and executed by one or more processors cause performance of operations at a receiver device, comprising:
   receiving video data from a sender device;
   detecting that a first packet is not received using sequence numbers in real time protocol headers, the packet containing data from a first video frame;
   adding a place holder for the first packet in a buffer at the receiver device;
   sending a request from the receiver device to the sender device for the retransmission of the first packet; and
   creating an estimated packet at the receiver device based on a combination of a second packet of video data previous to the first packet, a third packet of video data following the first packet, and a fourth packet of video data from a previous video frame that is spatially corresponding to the data of the first packet;
   creating an estimated frame at the receiver device based on the estimated packet;
   adding the estimated frame at the placeholder in the buffer;

running a first decoder on the buffer with the estimated frame;

wherein, when the retransmission of the first packet is received before a time limit expires, replacing the decoded estimated frame with a reconstructed frame associated with the retransmitted first packet into the buffer at the placeholder, and running a second decoder on the buffer with the frame associated with the retransmitted first packet.

6. The machine-readable storage medium of claim 5, further causing performance of operations comprising:

adjusting a number of packets stored in the buffer to minimize packet loss consistent with operating below a maximum end-to-end delay.

7. An electronic device comprising:

a processor; and a storage device bearing instructions, which when executed on the processor cause performance of operations that comprise:

receiving video data from a sender device;

detecting that a first packet is not received using sequence numbers in real time protocol headers, the packet containing data from a first video frame, adding a place holder for the first packet in a buffer;

sending a request to the sender device for retransmission of the first packet, and creating an estimated packet based on a combination of a second packet of video data previous to the first packet, a third packet of video data following the first packet, and a fourth packet of video data from a previous video frame that is spatially corresponding to the data of the first packet creating an estimated frame based on estimated packet;

adding the estimated frame at the placeholder in the buffer;

running a first decoder on the buffer with the estimated frame;

wherein, when the retransmission of the first packet is received before a time limit expires, replacing the decoded estimated frame with a reconstructed frame associated with the retransmitted first packet into the buffer at the placeholder, and running a second decoder on the buffer with the frame associated with the retransmitted first packet.

8. The electronic device of claim 7, wherein the instructions further cause performance of operations that comprise:

adjusting a number of packets stored in the buffer to minimize packet loss consistent with operating below a maximum end-to-end delay.

* * * * *

UNITED STATES PATENT AND TRADEMARK OFFICE
CERTIFICATE OF CORRECTION

| | | |
|---|---|---|
| PATENT NO. | : 7,827,458 B1 | Page 1 of 1 |
| APPLICATION NO. | : 10/379012 | |
| DATED | : November 2, 2010 | |
| INVENTOR(S) | : Ryan R. Salsbury et al. | |

It is certified that error appears in the above-identified patent and that said Letters Patent is hereby corrected as shown below:

On page 2, under "Other Publications", in column 2, line 4, delete "Concealmetn" and insert -- Concealment --, therefor.

On page 2, under "Other Publications", in column 2, line 6, delete "Proceessing," and insert -- Processing, --, therefor.

In column 4, line 67, delete "nm" and insert -- run --, therefor.

In column 5, lines 18-25, below "the subsequent encoding of packets." delete "Control then continues to block 330 where the estimated frame is placed into the stored bitstream 110 of the sender 101. After the completion of block 330, the sender 101 and the receiver 102 are once again running their respective encoder and decoder on the same bitstream. Control then returns to block 305 where the estimated frame will be used in the subsequent encoding of packets.".

In column 10, line 6, in Claim 7, after "packet" insert -- ; --.

Signed and Sealed this
Twenty-second Day of November, 2011

David J. Kappos
*Director of the United States Patent and Trademark Office*